April 1, 1952     R. H. BOGGS     2,590,838
AUTOMATIC SHUTOFF VALVE
Filed May 14, 1947
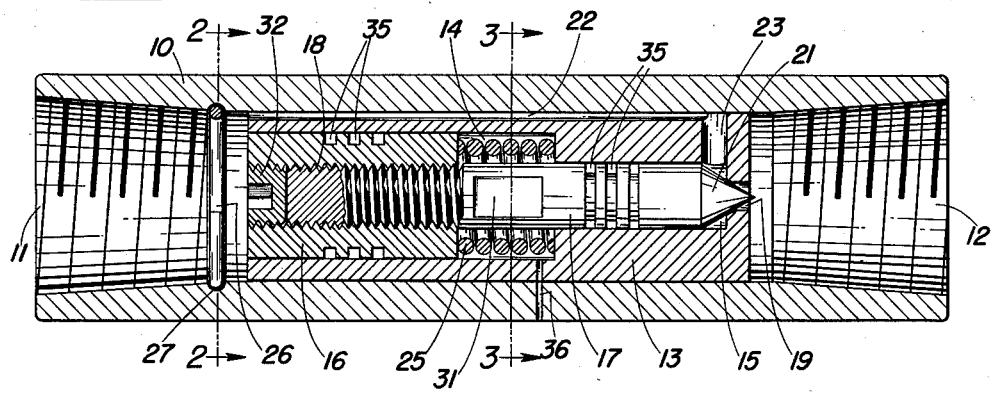
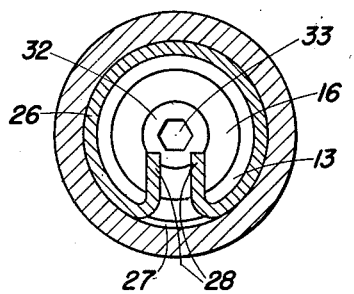
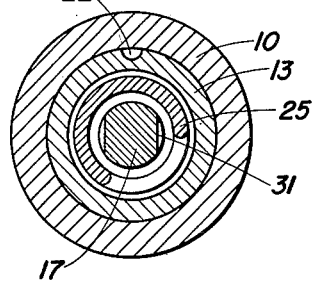
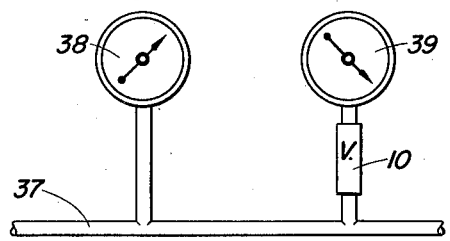
INVENTOR.
Raymond H. Boggs
BY
Attorney Patented Apr. 1, 1952

2,590,838

UNITED STATES PATENT OFFICE 2,590,838

AUTOMATIC SHUTOFF VALVE

Raymond H. Boggs, Coronado, Calif.

Application May 14, 1947, Serial No. 747,989

2 Claims. (Cl. 137—153)

(Granted under the act of March 3, 1883, as amended April 30, 1928; 370 O. G. 757)

This invention relates to valves, and more particularly to an automatic shutoff valve, which operates to close or otherwise restrict a fluid passage in response to fluid pressure in the line in which it is interposed.

In the operation of systems employing fluid under pressure, it is sometimes desirable to connect to the fluid line devices which should not receive the maximum pressure which might be applied to the line. It is accordingly an object of this invention to provide an automatic control valve which may be interposed between a device and the fluid pressure line which feeds fluid under pressure to the device.

It is a further object of this invention to provide a safety valve which will operate automatically to cut off or restrict fluid flow in a line when the pressure in the line exceeds a predetermined value.

This invention is particularly applicable for the protection of fluid pressure gauges, and it is accordingly an object to provide a cutoff valve which will permit employment of a sensitive, low-pressure gauge to secure accuracy at pressure indications of low value, and at the same time prevent the gauge from being damaged when the pressure in the line has risen to a value exceeding the maximum pressure of the gauge.

To fulfill these objects in accordance with this invention, there is provided a valve body having a passage through which fluid may flow. A valve member is mounted for movement in the valve body to open and close the fluid passage, and is so arranged as to be responsive to pressure in the fluid line. Biasing means are provided for normally retracting the valve member until the fluid pressure has risen to a predetermined value, sufficient to overcome the bias, whereupon the valve member is moved to close the passage.

In the particular embodiment illustrated a bore is formed in the valve body, in which the valve member reciprocates. One end of the bore is connected to the high pressure fluid line, while the other end is connected to the device which utilizes the fluid under pressure. Adjacent to the outlet, or device connected end of the bore, is formed a valve port, which is closed by movement of the valve member. The outlet end of the bore is of reduced cross section, as is the corresponding portion of the valve member, so that the pressure effective area of the valve member at the inlet end of the valve is greater than is the pressure effective area of the member at the outlet end of the valve. A passage is provided in the valve body between the two ends of the bore, through which fluid may flow through the valve. Spring means are provided for biasing the valve member to open the port.

In operation, the pressure in the line increases until a point is reached where the net force represented by the line pressure operating on the differential area of the valve member is sufficient to overcome the spring bias. At this point, the valve member moves to close the port, thereby isolating the fluid-utilizing device from increasing fluid pressures.

A specific embodiment of the invention is illustrated in the drawing, wherein Fig. 1 is a longitudinal section of a valve constructed in accordance with the invention.

Fig. 2 is a cross section taken along lines 2—2 in Fig. 1;

Fig. 3 is a section taken along lines 3—3 in Fig. 1;

Fig. 4 is a schematic diagram illustrating application of the valve of this invention to the protection of a low pressure gauge used in a fluid pressure line which may contain pressures exceeding the rating of the low pressure gauge.

The numeral 10 designates a substantially cylindrical valve body having internal threads 11 and 12 at its inlet and outlet, respectively. Secured within the body 10, as by press fitting, is an inner body 13, having an axial bore 14 therein. That portion of bore 14 which is next to the outlet 12 is of reduced cross section, as shown at 15.

Located within the bore 14 is a piston-like valve member 16, the outlet end 17 of which is of reduced cross section, corresponding to the reduced cross section of bore 15 as shown. The two sections of the valve member are preferably fabricated separately, with the narrower section 17 being screwed into a threaded hole 18 formed axially in the valve member 16.

At the end of the inner body 13, adjacent the outlet 12, the bore is further narrowed to form a valve port 19, in which seats a conical nose 21, formed at the end of the narrow portion 17 of the valve member. A longitudinal groove 22 is formed in the outer periphery of the inner body 13. It constitutes, with the cooperating wall of the body 10, a passage thru which fluid may flow from the inlet 11 to the outlet 12 of the valve. This passage is completed by a radial bore 23, which extends from the end of the groove 22 to the end of the narrow bore 15.

It is thus seen that the valve member 16 is subjected to fluid pressure at both its inlet end and its outlet end, the former, however, having the greater pressure-effective area by virtue of the narrowing of the bore at 15. Thus, pressure of fluid applied to the inlet end 11 of the valve tends to force the conical nose 21 of the valve member into the port 19, thereby closing the valve and blocking flow of fluid therethrough. The magnitude of this force is equal to the fluid pressure multiplied by the difference in area exposed at the inlet end 16 and the outlet end 17 of the valve member.

To offset this valve closing force at low line pressures, there is provided a helical spring 25 surrounding the base of the narrow portion 17 of the valve member. The spring 25 presses against the annular bottom of the large bore 14, and the annular surface on the portion 16 of the valve member. The valve member 16 is thus biased to keep the valve port 19 open. The valve spring 25 may be designed so that the force it exerts is substantially constant over the entire valve travel required to close the port 19. In this event, the valve will remain open until the line pressure, multiplied by the differential area exposed by the valve portions 16—17, exceeds the spring force. At this point the valve closes abruptly, preventing further passage of fluid through port 19.

A circular spring clip 26, seated in an annular groove 27 formed in the valve body 10, and having inwardly extending ends 28, prevents the valve member 16 from being completely expelled from the valve body 13 in the operation of the valve.

Relative adjustment between the narrow portion 17 and the normal portion 16 of the valve member may be had by screwing the member 17 in or out of the member 16, utilizing the flat portions 31 on the member 17, which are adapted to receive the jaws of a wrench. The members 16 and 17 are locked in relative position by a lock screw 32, having a hexagonal recess 33 for the reception of a wrench.

A fluid seal between the valve members 16 and 17, and the bores in which they reciprocate, is provided in the form of a plurality of annular grooves 35, formed around the peripheries of the portions 16 and 17 of the valve member.

A radial, pressure-relief passage 36 is formed in the valve body communicating with the bottom of bore 14. This passage serves to relieve pressures in the annular space containing the spring 25, as the valve reciprocates.

An example of the manner in which the valve of this invention may be employed is shown in Fig. 4, illustrating a high pressure fluid line 37, to which are attached a high pressure gauge 38, and a low pressure gauge 39. The latter is required to provide accuracy at low pressures, but it would be damaged when the pressure in the line 37 exceeds its rating. To protect the gauge 39 from such high pressures, the valve 10 is inserted in the gauge feed line, as shown.

The manner in which the valve of this invention operates in a system such as shown in Fig. 4 will now be described.

Assume that low pressure exists in line 37. Under this condition, the bias exerted by spring 25 keeps the valve member 16 away from the valve port 19, so that the valve is open, and both gauges 38 and 39 receive the full fluid pressure. In this pressure region, the gauge 39 is more accurate than the gauge 38. When the pressure in line 37 has driven the gauge 39 to the top of its scale, the valve 10 closes by virtue of proper preadjustment of the tension of spring 25. At this point the fluid pressure operating on the differential pressure-effective area at each end of the valve member 16 is sufficient to overcome the spring 25, so that the valve port 19 is closed by the conical nose 21. Further increase in pressure in the line 37 is not felt by the gauge 39, since it is cut off from the line by the valve 10, but is indicated by the high pressure gauge 38 alone.

It will be understood that this invention may be designed and utilized in any suitable shape, size or arrangement, depending upon the objects to be accomplished, and that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A valve comprising a body having an inlet, an outlet, and a bore communicating therebetween, a portion of said bore being of reduced cross section, a valve member having portions of cross section corresponding to the portions of said bore and movable therein, a valve port in said body located between said outlet and the reduced cross section portion of said bore, said port being blocked by said valve member upon movement thereof toward said port, fluid passage means communicating between said inlet and said bore portion of reduced cross section, and a spring biasing said member away from said port.

2. A valve comprising a body having a fluid passageway extending therethru and a port in said passageway, a bore communicating at each end with said passageway, one end of said bore being of reduced cross section, a piston-like valve member oscillatable in said bore and having portions of cross section corresponding to those of said bore, said valve member including a port-closing portion effective to close said port and extending from the reduced cross-section portion of said valve member, and means biasing said port-closing portion away from said port to open said passageway.

RAYMOND H. BOGGS.

REFERENCES CITED

The following references are of record in the file of this patent:

UNITED STATES PATENTS

| Number | Name | Date |
|---|---|---|
| 383,877 | Gale et al. | June 5, 1888 |
| 942,112 | Sprecher | Dec. 7, 1908 |
| 1,907,162 | Webb | May 2, 1933 |
| 2,005,813 | Thorsen | June 25, 1935 |
| 2,041,198 | McLean | May 19, 1936 |
| 2,185,461 | Guthrie | Jan. 2, 1940 |
| 2,198,487 | Sisk | Apr. 23, 1940 |
| 2,219,408 | Benz | Oct. 29, 1940 |
| 2,238,124 | Mathieson | Apr. 15, 1941 |
| 2,295,044 | McCarty | Sept. 8, 1942 |
| 2,307,949 | Phillips | Jan. 12, 1943 |
| 2,389,887 | Baxter et al. | Nov. 27, 1945 |